C. E. TITUS.
ARMOR FOR TIRES.
APPLICATION FILED AUG. 28, 1907.
955,831.
Patented Apr. 19, 1910.
2 SHEETS—SHEET 1.
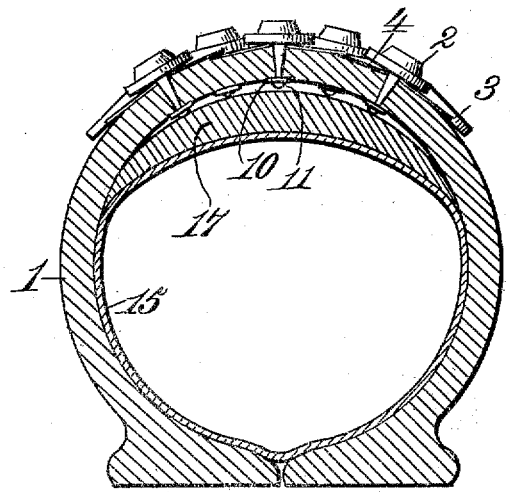
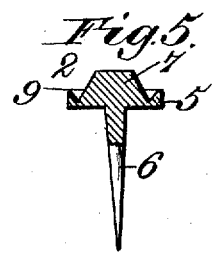
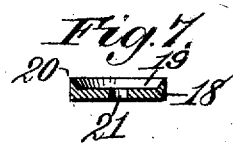
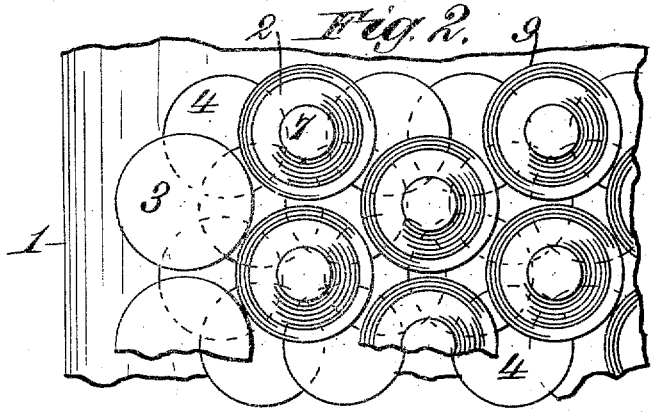
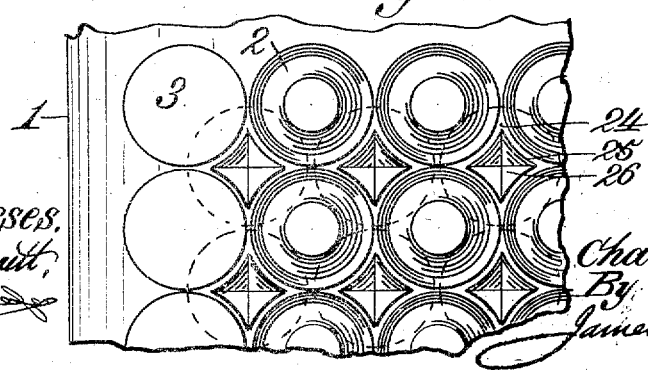
Witnesses
Inventor
Charles E. Titus.
By James L. Norris
Atty.

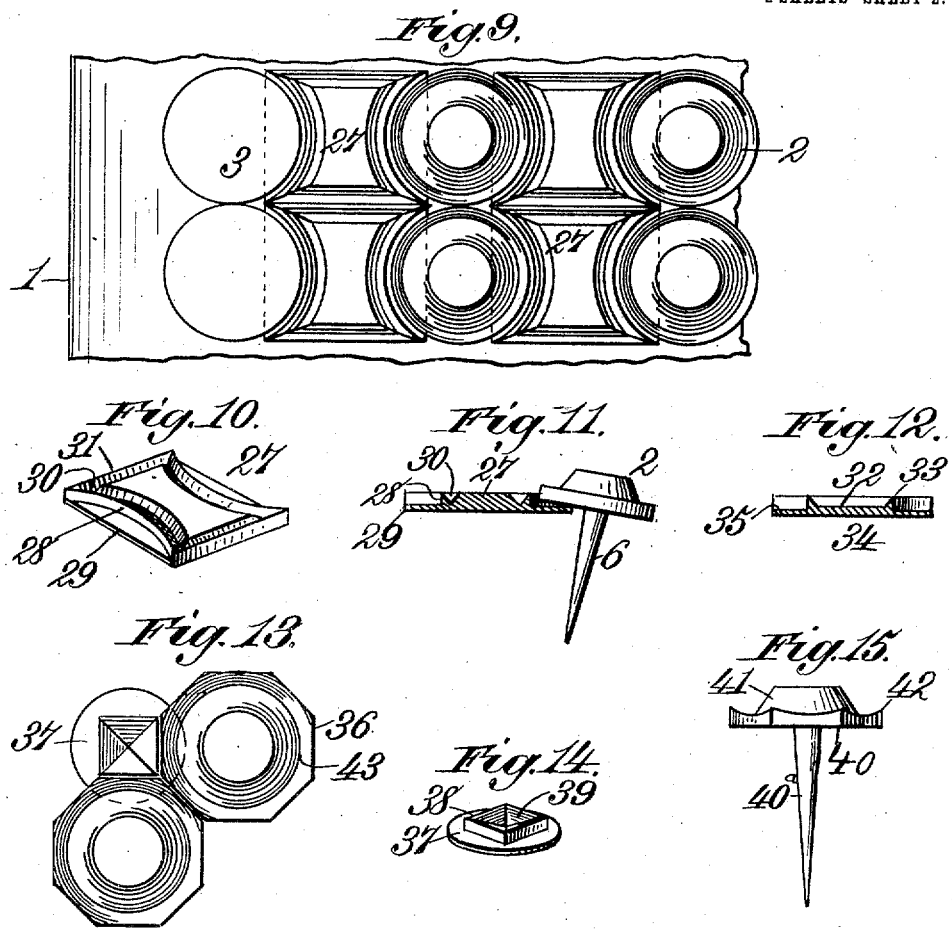

UNITED STATES PATENT OFFICE.

CHARLES E. TITUS, OF SPRINGFIELD, MASSACHUSETTS.

ARMOR FOR TIRES.

955,831.  Specification of Letters Patent.  Patented Apr. 19, 1910.

Application filed August 28, 1907. Serial No. 390,501.

*To all whom it may concern:*

Be it known that I, CHARLES E. TITUS, a citizen of the United States, residing at Springfield, in the county of Hampden and State of Massachusetts, have invented new and useful Improvements in Armors for Tires, of which the following is a specification.

This invention relates to pneumatic or cushioned tires for vehicles, in which the propelling force is applied directly from the axle to the tread of the wheel; and the object thereof is to provide a tire with means, in a manner as hereinafter set forth, which acts as an armor for the tread of the tire, thereby reducing the wear thereof, as well as preventing puncturing and overcoming any liability of the tire skidding or side slipping.

With the foregoing and other objects in view, the invention consists of the novel construction and arrangement of tread elements with respect to the tire, as hereinafter more specifically described and illustrated in the accompanying drawings, wherein is shown the preferred embodiment of the invention, but it is to be understood that changes, variations and modifications can be resorted to which come within the scope of the claims hereunto appended.

In the drawings, wherein like characters denote corresponding parts throughout the several views—Figure 1 is a transverse sectional view of a pneumatic tire showing the periphery thereof provided with an armor formed from a plurality of tread elements in accordance with this invention; Fig. 2 is a plan of the tire broken away; Fig. 3 is a plan showing a modified construction of armor; Fig. 4 is a perspective view of one form of combined tread element and nail; Fig. 5 is a vertical sectional view of another form of combined tread element and nail; Fig. 6 is a perspective view of one form of interposed arrester between the tread element and the periphery of the tire; Fig. 7 is a sectional view of one form of tread element; Fig. 8 is a view of one form of tread nail; Fig. 9 is a plan of a modified construction of armor; Fig. 10 is a perspective view of the form of arrester shown in Fig. 9; Fig. 11 is a sectional view of a modified form of arrester to be interposed between the tread element and the periphery of the tire, also showing a combined tread element and nail engaging with the arrester for maintaining it in position; Fig. 12 is a cross sectional view of a modified form of arrester; Fig. 13 is a plan of a modified form of armor; Fig. 14 is a perspective view of another form of arrester to be interposed between the tread element and the periphery of the tire; Fig. 15 is a perspective view of another form of combined tread element and nail.

Referring to Figs. 1, 2, 3, 4, 5 and 6 of the drawings, 1 denotes the outer tube or cover of a pneumatic tire which has mounted upon its periphery an armor in accordance with this invention, the said armor being formed of a plurality of tread elements 2, 3, and a series of interposed arresters 4. Each of the tread elements 2 consists of a body portion 5 having a pointed shank 6 depending approximately centrally therefrom. The upper face of the body portion 5 has projecting therefrom a truncated cone-shaped protuberance 7. The body portion 5 is furthermore provided with an annular groove V-shaped in cross section which is formed on the body portion by a ridge 9 surrounding the lower portion of the protuberance 7. The shank 6 of the tread element extends through the cover 1 and carries on its lower end a washer 10, and to secure the washer upon the inner portion of the shank 6 the terminus of the shank is upset as at 11 and by such an arrangement the tread element is fixedly secured to the cover 1. The body portion of each of the tread elements 2 is circular, and to prevent the puncturing of the cover or tire by the passage of anything sharp through the space formed between the tread elements 2, as well as the tread elements 3, flat disk-like arresters 4 extend across said space at the bottom thereof, the arresters 4 being interposed between the body portion of the tread elements and the periphery of the cover 1, the arresters 4 being maintained in position by the tread elements. The outer rows of each of the tread elements (the elements of the rows being indicated by the reference character 3) are shaped somewhat differently from the tread elements 2, and in this connection it will be stated that the body portion 12 of the tread elements 3 has a flat upper face 13, which is uninterrupted throughout. Depending from the body portion 12 is a pointed shank 14 which is secured in the same manner to the cover 1 as the shank 6. The tread elements 3 of the outer rows of tread elements give support to the inner rows of tread elements in case of the protuberance 7 abutting against stones or glancing off of stones or other obstructions. To prevent the washers 10 of the upset ends 11 of the shanks 6 or 14 injuring the inner tube 15 a resilient strip of material 17 such as rubber is interposed between the tube 15 and the inner face of the cover 1.

In Fig. 7 a modified form of tread elements is shown, and which consists of a body portion 18 having its upper face countersunk, as at 19, forming a marginal rib 20. The body portion 18, approximately centrally thereof, is provided with an opening 21 through which extends the shank of the tread nail for securing the tread element to the cover 1. The form of tread nail used in connection with the tread element shown in Fig. 7 is illustrated in Fig. 8 and which consists of a shank 22 terminating in a head 23 of truncated cone shape. The countersunk portion 19 constitutes a seat for the head 23 when the tread nail secures the tread element to the cover 1.

In Fig. 3 a modified construction of armor is illustrated, the armor consisting of either the form of tread element shown in Fig. 5 or that shown in Fig. 7 in connection with the tread nail shown in Fig. 8, but the arresters are differently constructed from the form of arresters shown in Fig. 6. The arresters shown in Fig. 3 are indicated by the reference character 24 and consists of a flat circular disk having approximately centrally thereof a substantially diamond-shaped protuberance 25 with the upper face 26 thereof depressed in a curvilinear manner. The sides of the protuberances 26 are segment-shaped so as to conform to the shape of the recess or space formed between the abutting tread element. The arrester 24 extends between a series of tread elements and the periphery of the cover, such arrangement maintaining the arresters 24 in position.

In Fig. 9 a modified form of armor is illustrated and the tread elements employed are of a construction similar to that shown in Fig. 5 or Fig. 7 in connection with the tread nail shown in Fig. 8; but the tread elements are somewhat enlarged. The arresters interposed between the tread elements and the periphery of the tire are of a different construction from that shown in Figs. 1 and 3, and in this connection it will be stated that each of the arresters consists of a rectangular plate 27 having curved ridges 28 to form the underlying flanges 29. The upper face of the plate is provided with a groove 30 substantially V-shaped in cross section, forming thereby a marginal ridge 31. The flange 29 constitutes a seat for the tread elements so that the arresters will be secured upon the cover when the tread elements are attached thereto. The seating of the tread elements upon the arresters is shown in Fig. 11.

In Fig. 12 a modified construction of arrester is shown and which is substantially the same as that shown in Figs. 10 and 11 with the exception that the upper face of the arrester is countersunk as at 32 to form the ridge 33. The arrester in Fig. 12 is indicated by the reference character 34 and the flanges upon which the tread elements are seated are indicated by the reference character 35.

In Fig. 13 a modified form of armor in accordance with this invention is illustrated and which consists of a series of tread elements 36 substantially octagonal in contour and a series of interposed arresters 37. The tread elements 36 are of a construction similar to that shown in Figs. 5 and 7 in connection with Fig. 8, with the exception that the shape is different. The arresters 37 are formed of a circular disk having arranged approximately centrally of its upper face a square protuberance 38 having the upper face thereof sloping inwardly as at 39. The arresters when in position extend below the tread elements as clearly shown in Fig. 13 and one of the sides of each of the elements which are mounted upon the arresters is arranged in close proximity to one side of the protuberance, the latter closing the space formed between a series of abutting tread elements.

In Fig. 15 a modified construction of tread element is shown, which consists of a body portion 40 having a pointed shank 40ᵃ depending therefrom. The body portion has a truncated cone-shaped protuberance 41 formed integral with the upper face and which is surrounded by a series of projections 42 formed at the edge of the body portion and at a point removed from the protuberance 41 thereby providing a groove which extends around the protuberance 41.

The advantages of the invention may be summarized as follows: Since the tread elements are independent of each other and are individually free to move with the tire body, there is no sacrifice of resiliency. At the same time, the armor efficiently carries out its primary functions, viz., protecting the tread of the tire against puncturing, by deflecting obstructions; preventing skidding or side slipping and obtaining perfect traction without heating from friction. Furthermore, the interengaging relation of certain of the tread elements prevents the stripping of the armor in case the tire should encounter a stone or other large obstruction which would produce a stress on the outer rows of the elements, and the arrangement of the tread elements to interengage with the arresters assists in equalizing the stresses.

What I claim is—

1. An armor for pneumatic tires comprising a plurality of abutting tread elements each provided with protuberances, and a plurality of arresters interposed between the tread elements and the tire cover, said arresters being provided with a raised portion interposed between a plurality of adjacent tread elements.

2. An armor for pneumatic tires comprising a series of abutting circular tread elements having intervening spaces therebetween, each of said elements being provided with a ridge and a protuberance and means for securing the element to a tire, arresters interposed between the elements and the tire and constituting means for closing the spaces, said arresters being maintained in position by said elements and provided with raised portions having the edges thereof curvilinear in contour.

3. An armor for pneumatic tires comprising a series of tread units permanently secured to the tire and having spaces therebetween and a series of arresters arranged to close the spaces, unattached to the tire and having portions thereof projecting under the adjacent tread units.

4. An armor for pneumatic tires comprising a series of tread units permanently secured to the tire and having spaces therebetween and a series of arresters arranged to close the spaces, unattached to the tire and having portions thereof projecting under the adjacent tread units, each arrester being formed with a protuberance.

5. An armor for pneumatic tires comprising a series of tread units having projections at their edges and having intervening spaces therebetween, means for permanently attaching the tread units to the tire, a series of arresters arranged to close said spaces, unattached to the tire and having portions thereof projecting under the adjacent tread units, each arrester having a projection which abuts and matches with portions of the projections of the adjacent tread units.

6. An armor for pneumatic tires comprising a series of tread units having beveled ridges at their edges and having intervening spaces therebetween, means for permanently attaching the tread units to the tire, a series of arresters arranged to close said spaces, unattached to the tire and having portions thereof projecting under the adjacent tread units, each arrester having beveled ridges at its edges, matching the ridges of the adjacent tread units and arresters and forming therewith substantially V-shaped projections.

7. An armor for pneumatic tires comprising a series of tread units permanently attached to the tire and having spaces intervening therebetween, a series of arresters unattached to the tire and having portions thereof projecting under the adjacent tread units and means for holding the arresters against turning on the surface of the tire with relation to the tread units.

8. An armor for pneumatic tires comprising a series of tread units permanently attached to the tire, arranged in abutting relation and so shaped that spaces intervene therebetween, and arresters arranged to close the spaces and having portions thereof projecting under the adjacent tread units, said arresters being movable in the direction in which the tread of the tire yields, independently of the tread units.

In testimony whereof I have hereunto set my hand in presence of two subscribing witnesses.

CHARLES E. TITUS.

Witnesses:
 WM. A. KIDDY,
 MOLLIE I. DALEE.